(12) United States Patent
Huhn et al.

(10) Patent No.: US 7,178,504 B2
(45) Date of Patent: Feb. 20, 2007

(54) INTAKE MODULE FOR AN INTERNAL COMBUSTION ENGINE

(75) Inventors: Werner Huhn, Solignano (IT); Markus Netz, Untergruppenbach (DE); Jurgen Schwarz, Eibensbach (DE); Jan Stotz, Wustenrot (DE); Wolf Zimmermann, Marbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/347,832

(22) Filed: Feb. 4, 2006

(65) Prior Publication Data

US 2006/0150950 A1 Jul. 13, 2006

Related U.S. Application Data

(63) Continuation-in-part of application No. PCT/EP04/08489, filed on Jul. 29, 2004.

(30) Foreign Application Priority Data

Aug. 7, 2003 (DE) ................. 103 36 196

(51) Int. Cl.
*F02M 35/104* (2006.01)
*F02D 9/10* (2006.01)

(52) U.S. Cl. ............ 123/336; 123/184.35; 123/184.36; 123/399

(58) Field of Classification Search ........... 123/184.25, 123/184.26, 184.31, 184.35, 184.36, 184.43, 123/184.44, 184.48, 184.49, 336, 337, 399
See application file for complete search history.

(56) References Cited

U.S. PATENT DOCUMENTS

| 3,809,032 | A | * | 5/1974 | Morris ................... | 123/184.35 |
| 5,664,533 | A | | 9/1997 | Nakayama et al. .... | 123/184.42 |
| 5,890,464 | A | * | 4/1999 | Martinelli .............. | 123/184.36 |
| 6,408,809 | B2 | * | 6/2002 | Suzuki ................... | 123/184.36 |
| 6,425,363 | B1 | | 7/2002 | Lieske et al. .......... | 123/184.21 |
| 6,446,591 | B1 | | 9/2002 | Chae et al. ............ | 123/184.61 |

FOREIGN PATENT DOCUMENTS

| DE | 44 03 219 | | 8/1995 |
| DE | 004403219 | A1 * | 8/1995 |
| EP | 0 501 514 | | 9/1992 |
| EP | 0 931 926 | | 7/1999 |

\* cited by examiner

*Primary Examiner*—T. M. Argenbright
(74) *Attorney, Agent, or Firm*—Klaus J. Bach

(57) ABSTRACT

In an intake module for an internal combustion engine having an intake module which includes a housing with a first volume in which air drawn in via an inlet orifice accumulates, a second volume in which the air is distributed to various cylinders of the engine and which contains inlet ports leading to inlet valves of the engine, a support module with associated throttle elements is arranged between the first volume and the second volume of the intake module within the housing so as to provide for short travel passages between the throttle elements and the intake valves of the engine.

10 Claims, 4 Drawing Sheets

INTAKE MODULE FOR AN INTERNAL COMBUSTION ENGINE

This is a Continuation-In-Part Application of International Application PCT/EP2004/008489 filed Jul. 29, 2004 and claiming the priority of German application 103 36 196.0 filed Aug. 7, 2003.

BACKGROUND OF THE INVENTION

The invention relates to an intake module for an internal combustion engine having a first volume receiving the combustion air and a second volume from which the combustion air is distributed to the cylinders of the internal combustion engine.

The published patent application DE 4403219 discloses a prefabricated intake module for a multi-cylinder internal combustion engine. The intake module has a divided housing comprising a first shell with an air inlet and a second shell, which has an intake pipe, which opens into an air intake manifold. From this manifold inlet, inlet ports lead to the inlet valves of the internal combustion engine. For the injection of fuel into the air flow through the inlet ports an injection valve is provided at each outlet opening of the inlet ports inside the housing. In order to make the intake module as simple and compact as possible, an intake air filter is arranged in the module housing. The two shell parts are tightly bonded or welded.

EP 0 931 926 A1, EP 0 501 514 B1 and U.S. Pat. No. 5,664,533 disclose internal combustion engines in which throttle mechanisms having throttle elements, which regulate the quantity of air delivered to the internal combustion engine, are arranged between an air filter and an intake manifold having multiple inlet ports.

U.S. Pat. No. 6,446,591 B1 and U.S. Pat. No. 6,425,363 B1 describe intake systems for internal combustion engines, within which compensation flaps are arranged, which make it possible to adjust the intake distance covered by the air drawn in by the internal combustion engine. In this way the intake air travel distance and the volume of the intake system can to a certain extent be adjusted to the speed of the internal combustion engine. Such an intake system is also referred to as a variable inlet manifold.

It is the object of the present invention is to provide an intake module of the aforementioned type which however will provide for improved air flow to the inlet ports leading to the inlet valves.

SUMMARY OF THE INVENTION

In an intake module for an internal combustion engine having an intake module which includes a housing with a first volume in which air drawn in via an inlet orifice accumulates, a second volume in which the air is distributed to various cylinders of the engine and which contains inlet ports leading to inlet valves of the engine, a support module with associated throttle elements is arranged between the first volume and the second volume of the intake module within the housing so as to provide for short travel passages between the throttle elements and the intake valves of the engine.

The intake module accordingly comprises three main elements: a housing having at least two parts, and the throttle mechanism. The throttle mechanism is arranged in the housing so that two basically separate volumes are created. The first volume serves for the accumulation of air which is drawn in via an air inlet orifice in the housing and then flows via the throttle mechanism into the second volume. The throttle mechanism is comprises a support module and a throttle element arranged thereon. The throttle element is activated mechanically or by electric servomotors, which are preferably arranged on the support module.

On the second volume side the housing has inlet ports, which lead the aspirated air via the inlet valves to the combustion chambers. The inlet ports are preferably used for ram pipe supercharging.

In a particular embodiment of the invention two or more throttle elements are arranged on the support module. In internal combustion engines which have a large number of cylinders and use a throttle valve, the distances of the inlet ports from the throttle valve vary. This results in irregular filling of the inlet ports and the downstream combustion chambers. This leads to poor efficiency and poor exhaust values of the internal combustion engine. The overall space available on the support element can advantageously be used for an arrangement of multiple throttle elements. The arrangement of multiple throttle elements reduces the cross-sectional constriction and the throttle losses associated therewith. This so-called multi-flow aspiration via a plurality of throttle elements furthermore leads to a more homogeneous charging of the combustion chambers by reducing the differences in the distance between the throttle valve and the inlets of the inlet ports.

In a further development of the invention the throttle element is an electrically driven throttle valve. The throttle valve is a disc-shaped closing element, which, by rotation about its central axis, regulates the air mass flow. By constricting the flow cross-section, the throttle valve causes a throttling of the air flow. If the circular surface of the throttle valve is perpendicular to the direction of flow, this results in maximum throttling, if this surface is parallel to the direction of flow the throttling is minimal. The throttle valve can be driven by a servomotor.

In a further development of the invention separate drive means are assigned to each throttle element. Different design distances between the throttle elements and an air inlet orifice of the intake module produce different flow conditions at the throttle elements. As a result the air mass flow rates through the throttle elements also differ. These differences ultimately result in inhomogeneous charging of the combustion chambers. The separate drive means permits adaptive actuation of the throttle elements, with the result that inhomogeneous charging of the combustion chambers can be avoided.

In still a further development of the invention a common central connector provides for the electrical connection from a control unit to the throttle elements. In order to facilitate assembly and to avoid any confusion with regard to the connectors, it is advantageous, particularly where multiple electrical servomotors are used, to connect the throttle elements to the control unit via a common connector. The connector is either fixed to the intake module or to a trailing cable emerging from the intake module.

Advantageously, a first shell part comprises the first volume, a second shell part comprises the second volume and the support module is arranged between the shell parts. The air inlet orifice is assigned to the first shell part; the second shell part comprises the inlet ports for charging the combustion chambers with an air-fuel mixture. The first and second shell parts and the support module are preferably made in a molding process from a metallic material or from plastics.

Preferably, the first shell part, the second shell part and the support module each have at least one flange face, and the parts are joined together at the flange faces and are held together by at least one fastener. The support module has a peripheral edge, which is machined all round on both sides. The first and second shell parts likewise have a machined edge facing the support module in the assembled state. The throttle module is arranged between the first and second shell parts and the parts are held together by at least one fastener, so that no air can flow into the module via the joints. This arrangement makes the intake module easy to assemble.

In a particular embodiment of the invention the support module, the first shell part and the second shell part are releasably connected by bolts. The components are firmly connected to one another by the bolt tensioning forces. In the event of any malfunction of the intake module, it is advantageous if this can be dismantled and if individual components can be inspected for correct functioning and defective parts can be replaced. This requires releasable and reusable joints and fastening elements between the components of the intake module.

Preferably, for the connection of vacuum lines union connections are arranged in the second shell part and/or in the support module. In the volume of the second shell part, which is arranged downstream of the throttle elements in respect of the air flow, a stronger vacuum prevails. This vacuum can advantageously be used for brake servo assistance, for a recovery cycle of the tank system or for other functions. The vacuum lines are pushed onto the union connections, which establish a connection to the volume subjected to a vacuum.

An important feature of the internal combustion engine according to the invention with a V-shaped cylinder arrangement is the arrangement of an intake module between the cylinder heads which results in a compact structure. The arrangement of the throttle valves in the intake module makes optimum use of the overall space. The short distances from the throttle valve to the inlet ports in the cylinder head have a positive effect on the responsiveness of the internal combustion engine. In addition, this solution permits the arrangement of multiple throttle valves in the intake module. The multi-flow aspiration leads to a more uniform filling of the inlet ports and charging of the combustion chambers arranged downstream in the intake flow. This serves to increase the power and efficiency of the internal combustion engine. In addition the exhaust emissions are reduced.

Further features and combinations of features will become apparent from the following description on the basis of the accompanying drawings. Actual exemplary embodiments of the invention are shown in simplified form in the drawings and are explained in more detail in the description.

DESCRIPTION OF A PARTICULAR EMBODIMENT OF THE INVENTION

Figure 1:
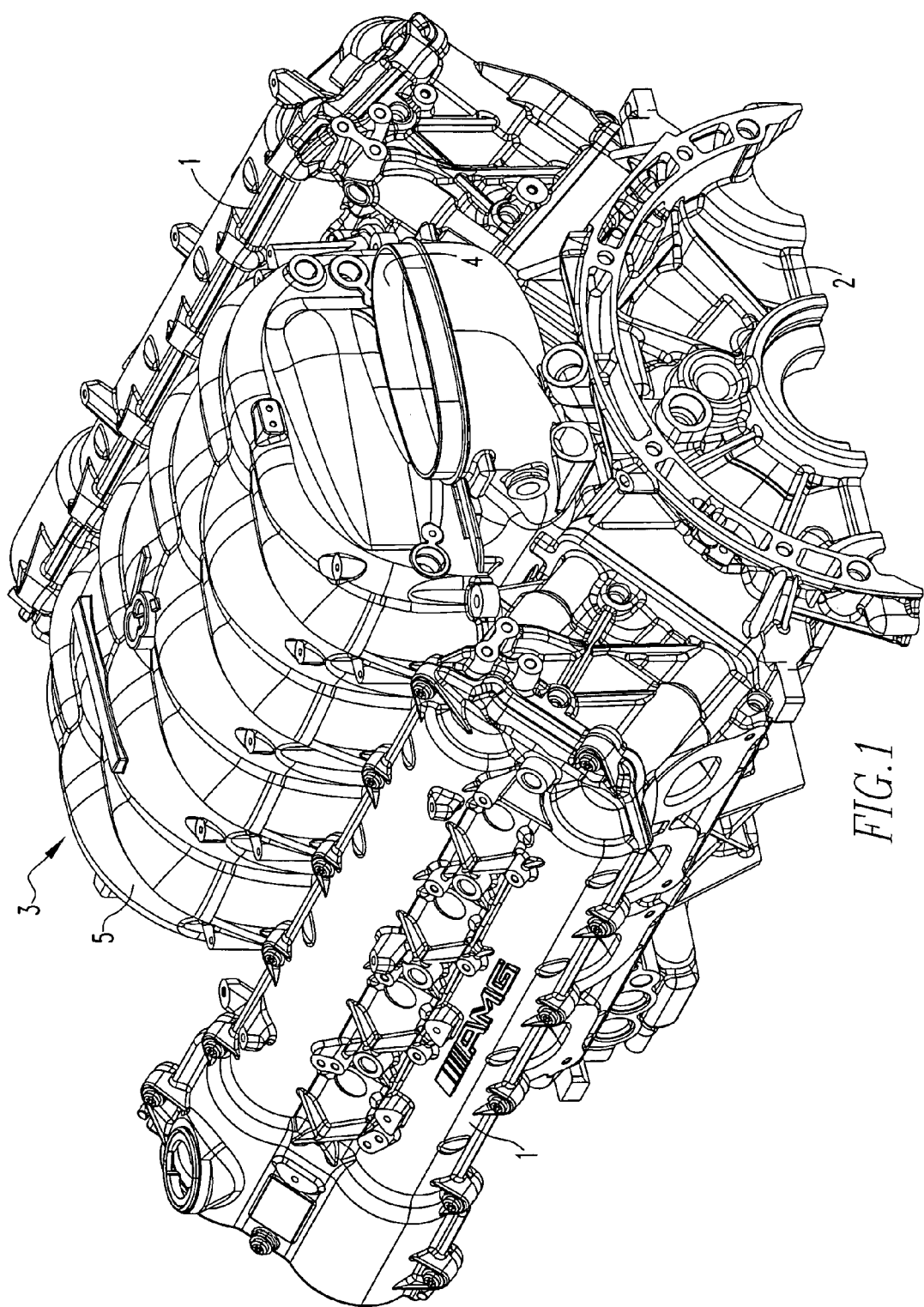
FIG. 1 shows an intake module according to the invention arranged between the cylinder banks of an internal combustion engine with a V-shaped cylinder arrangement.

In FIGS. 1 to 4 identical components are identified by the same reference numerals.

FIG. 1 shows an intake module 3 between the cylinder banks of an 8-cylinder internal combustion engine with a V-shaped cylinder arrangement. Such internal combustion engines are often used in automobiles. The cylinders 1 are bolted to a crankcase 2 with a cylinder block in which pistons, crankshaft and the combustion chambers are arranged and on which cylinder heads are disposed. During its downwards movement a piston draws in air through an intake section and air or fuel-enriched air flows through valves arranged in the cylinder head into the combustion chamber. Following a power stroke air is sucked into the cylinders by the pistons and a fuel-air mixture is compressed and combustion is initiated through compression or applied ignition. The piston transmits the energy released by the combustion to the crankshaft via a connecting rod.

Figure 2:
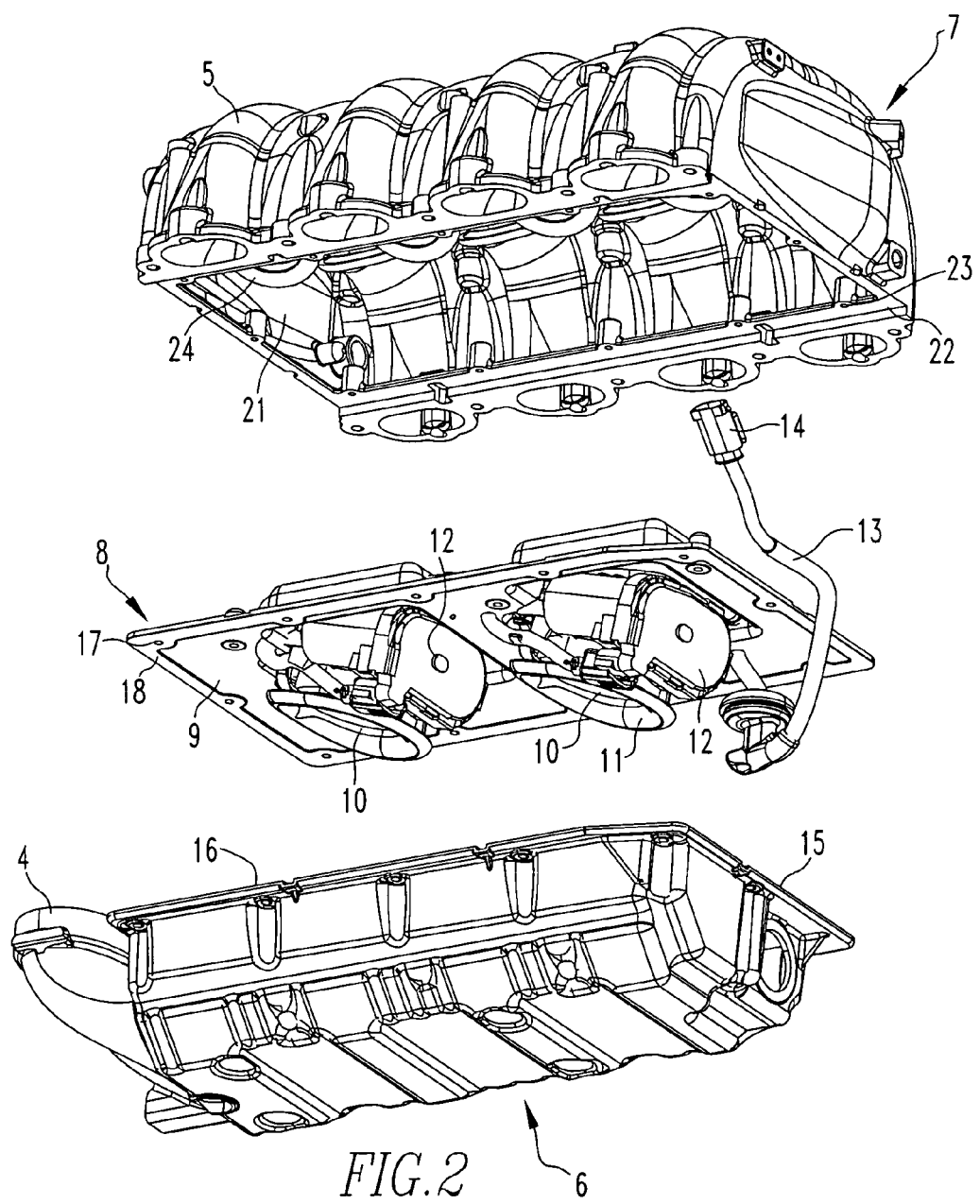
FIG. 2 shows the components of the intake module in an exploded view.

An engine control unit (not shown) ensures an optimum combustion sequence and for this purpose processes the signals from sensors arranged in the internal combustion engine and, as a function of computed values, activates actuators such as fuel injection valves or the throttle valves 10 shown in FIG. 2. The aspirated air flows via an intake section (not shown) to the combustion chamber. The intake section has an air filter, which cleans the fresh intake air. From there the air flows past an air mass flow sensor. The measured mass flow serves as input variable for the control unit.

Figure 3:
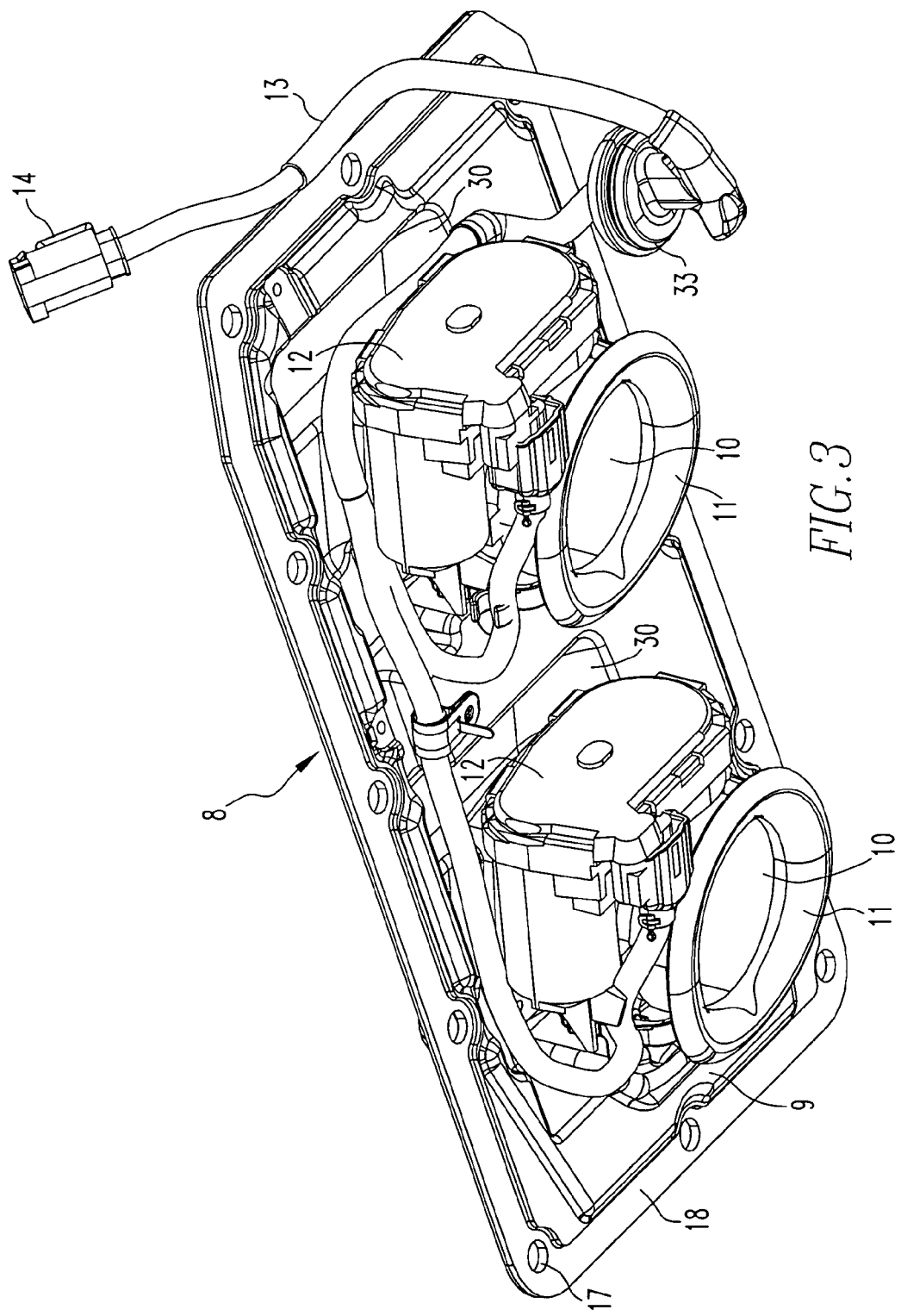
FIG. 3 shows a detail of the throttle mechanism of FIG. 2.

The air flows via inlet orifices 4 to the throttle valves 10 shown in FIGS. 2 and 3, which control the air mass flow as a function of an internal combustion engine power output demanded via an accelerator pedal. The air mass flow is then distributed to the various inlet ports 5, which carry the air flow to the combustion chambers. The fuel is injected either directly into the combustion chamber or in the port injection embodiment into the collecting chamber or the inlet ports 5.

As shown in FIG. 2 the intake module comprises three sub-assemblies: a first shell part 6, a second shell part 7 and a throttle structure 8. The first shell part 6 has an inlet orifice 4, via which air flowing past the air mass flow sensor enters the first shell part 6. The first shell part 6 incorporates a volume in which the air is uniformly distributed. The external contour of the first shell part 6 is designed according to the overall space available in the internal V-shape of the internal combustion engine. At its edge the first shell part 6 has an outwardly directed collar 15. This collar 15 is machined in order to act as a flange face on the side facing the support module. The flange face has through-holes 16, of which there are twelve in the embodiment shown.

The throttle mechanism 8 is arranged between the first shell part 6 and the second shell part 7 of the intake module. According to FIG. 2 and FIG. 3 two throttle valves 10 with intake orifice 11 and the associated servomotors 12 are arranged on a support module 9. From the two servomotors 12 electrical leads 13 extend to a common connector 14, which provides the contact between the two servomotors 12 and the control unit. The support module has through-holes 17, of which there are twelve in the embodiment shown. A peripheral edge 18 extending round the support module 9 is machined on both sides.

The air flows via the two throttle valves 10 into the second shell part 7. There the air is distributed in a collecting chamber 21 as shown in FIG. 2 and flows into the inlet ports 5, which lead to the combustion chambers. The flow wave sequences generated by the piston movement are utilized for supercharging. After opening of the valve, the piston in its downward movement generates a vacuum wave, which moves counter to the direction of flow away from the combustion chamber along the inlet ports 5. At the collecting chamber 16 the stepped cross section causes a reflection of the vacuum wave. The vacuum wave running back to the combustion chamber is utilized for the charging of the combustion chamber. A peripheral edge 22 is machined in order to act as flange face, this flange face having blind holes 23, of which there are twelve in the embodiment shown.

The intake module 3 is assembled by bolting the three sub-assemblies together. The flange face of the support module 8 is positioned on the flange face of the first shell part 6. The flange face of the second shell part 7 is disposed the flange face of the support module 9 remote from the intake orifice 11. The bolt holes of the first shell part 6 and of the support module 9 are aligned with the threaded blind hole of the second shell part 7. The three components are joined by bolts (not shown). The arrangement of the connection makes the bolts readily accessible for assembly. Instead of bolts other releasable fasteners such as clips, snap elements etc. can naturally also be used. The intake module can be prefabricated and tested before installation. The releasable connections allow the module to be dismantled into individual parts for testing individual components, for example. Where there is no need for disassembly, non-releasable connections such as adhesive bonding, welding, rivets etc. may also be used in place of releasable connections. The machining of the flange faces is necessary in order to provide flat faces smooth enough to obtain airtight joints. With this arrangement, the throttle valves 10 are arranged at a very short distance from the combustion chambers, which minimizes friction and flow losses and also improves the responsiveness and the dynamics of the system. By arranging the throttle mechanism 8 within the intake module, the overall space available there provides the space for two throttle valves 10 connected in parallel. Any uneven filling of the inlet ports 5 resulting from the varying distance of the throttle valves 10 from the inlet orifice 4 of the first shell part 6 can be compensated for by differing actuation of the throttle valves 10. The throttle valve 10 next to the inlet orifice is opened to a lesser degree than the valve remote from it, so that the air mass flow through the two throttle valves 10 is equal and the downstream inlet ports 24 are uniformly filled. This compensation is all the more important the longer the cylinder banks and the greater the associated differences in the distance between the throttle valves 10 and the inlet orifice 4 are.

FIG. 3 shows the servomotors 12, which are partially accommodated in recesses 30 in the support module 9, thereby reducing the distance from the intake orifice 11 to the support module 9. When assembled, this ensures that the intake orifice 11 is at an adequate distance from the first shell part 6, so that the air flows to the intake orifice 11 without throttle losses.

Figure 4:
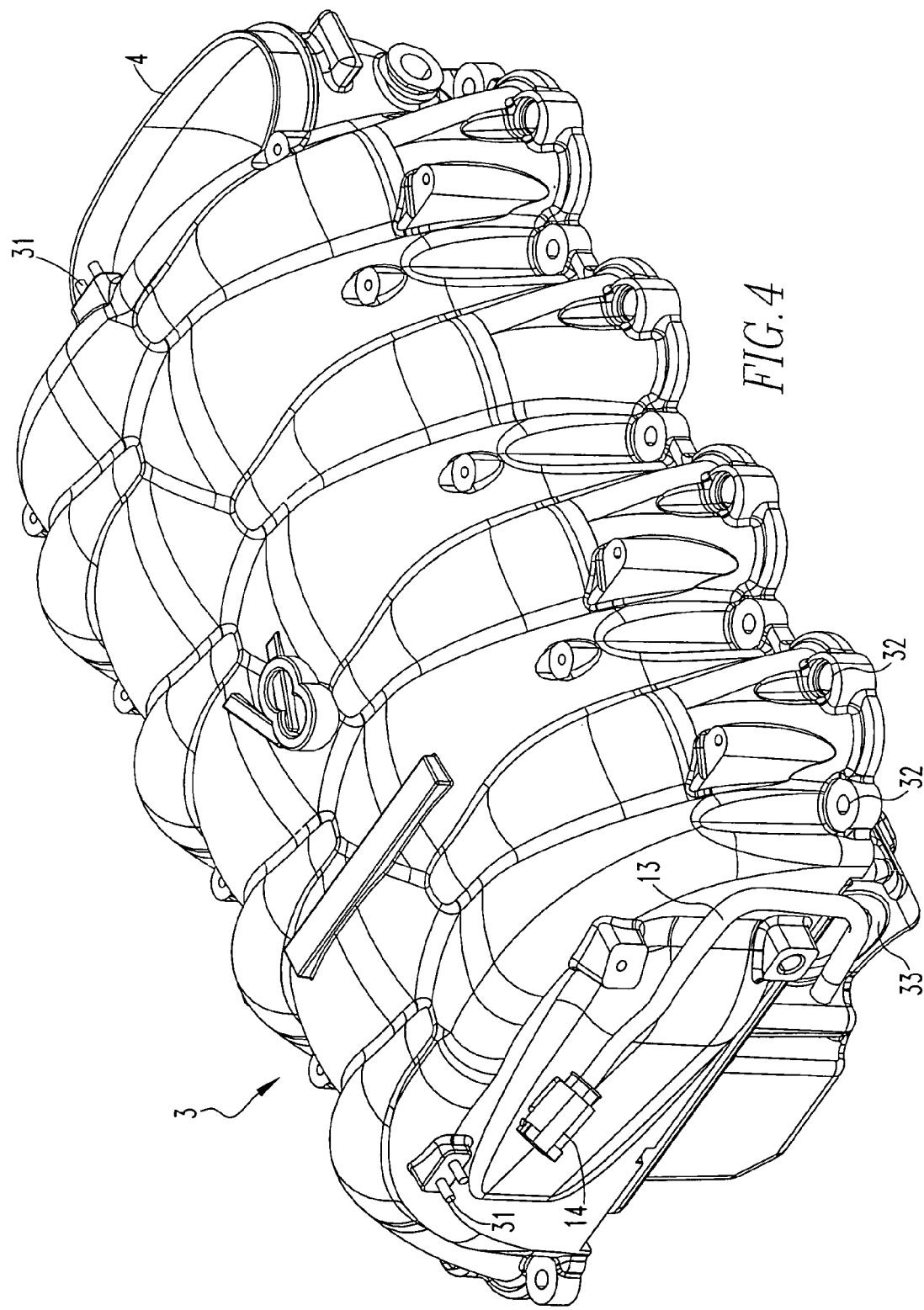
FIG. 4 shows a fully assembled intake module.

FIG. 4 shows a fully assembled intake module. Union connections 31, to which systems such as the brake system etc. are connected, in order to utilize the vacuum generated in the second shell part 7, are fitted to the second shell part 7. The second shell part 7 of the intake module is fixed by means of bolts (not shown), which are inserted into the through-holes 32 and screwed into the cylinder head 1. The flange face of the second shell part 7 at the transition from the inlet ports 5 to the cylinder head is advantageously machined in one operation together with the flange face which is joined to the support module 9. The electrical leads 13 for activation of the servomotors 12 are led out via an opening in the first shell part 6 of the intake module, which is sealed air-tightly by a seal 33. The cables for the two servomotors 12 terminate in a common connector, which is fixed to the intake module.

In a modified embodiment more than two throttle valves 10 are arranged on the support module. This permits uniform charging of the combustion chambers, particularly in internal combustion engines having a large number or cylinders.

In another modified embodiment only one throttle valve is arranged on the support module. The advantages of the structure of the intake module can naturally also be utilized in conjunction with one throttle valve. It is preferable to use one throttle valve on internal combustion engines having a small number of cylinders.

In this application the differences in the distance between the combustion chambers and throttle valve are small, which justifies the use of only one throttle valve, that is to say the combustion chambers are still charged uniformly enough.

In a modified embodiment the intake module, the first shell part 6 and the second shell part 7 may be joined with the housing being open at the front face. A throttle mechanism 8 with a support module 9 can then be inserted into the housing opening. The three parts are joined at the flange faces and held together by bolts. A separate cover or a cover integrally formed with the support module is bolted to the two housing parts and closes the opening of the housing. The union connections 31 for the connection of vacuum lines and the inlet orifice 5 would advantageously be provided in the cover.

What is claimed is:

1. An intake module for an internal combustion engine, said module having an orifice (4) and a first volume (16) in which air drawn in via an orifice (4) accumulates, a second volume (21), in which the air is distributed and which contains inlet ports (5) leading to the inlet valves, a housing which defines the two volumes, and a throttle mechanism (8) for controlling the air mass flow drawn in by the internal combustion engine, said the throttle mechanism (8) comprising a support module (9) and an associated throttle element, which is arranged between the first volume and the second volume of the intake module.

2. The intake module as claimed in claim 1, wherein at least two throttle elements are arranged on the support module (9).

3. The intake module as claimed in claim 1, wherein the throttle element is an electrically driven throttle valve (10).

4. The intake module as claimed in claim 1, wherein at least two throttle elements (10) or arranged on the support module (9) and each throttle element (10) is provided with a separate electric drive means (12).

5. The intake module as claimed in claim 4, wherein a common central connector (14) is provided for establishing the electrical connection from a control unit to the throttle elements (10).

6. The intake module as claimed in claim 1, wherein a first shell part (6) comprises the first volume, a second shell part (7) comprises the second volume and the support module (9) is arranged between the shell parts (6, 7).

7. The intake module as claimed in claim 6, wherein the first shell part (6), the second shell part (7) and the support module (9) each have at least one flange face and these parts are joined together at the flange faces and being held together by at least one fastener.

8. The intake module as claimed in claim 7, wherein the support module (9), the first shell part (6) and the second shell part (7) are releasably joined by bolts.

9. The intake module as claimed in claim 6, wherein union connections (31) for the connection of vacuum lines are arranged in at least one of the second shell part (7) and the support module (9).

10. An internal combustion engine having cylinder banks in a V-shaped arrangement and including cylinder heads with inlet passages for the gas flow to the cylinders, said engine including an intake module having an orifice (4) and a first volume (16) in which air drawn in via the orifice (4) accumulates, a second volume (21), in which the air is distributed and which contains inlet ports (5) leading to the inlet passages, a housing which defines the two volumes, and a throttle mechanism (8) for controlling the air mass flow drawn in by the internal combustion engine, said the throttle mechanism (8) comprising a support module (9) and an associated throttle element (10), which is arranged between the first volume and the second volume of the intake module, said intake module being arranged in the space between the cylinder banks.

* * * * *